United States Patent
Ramaswamy et al.

(10) Patent No.: US 11,302,926 B2
(45) Date of Patent: Apr. 12, 2022

(54) FUEL-CELL CATALYST INK ADDITIVES TO INHIBIT IONOMER PERMEATION

(71) Applicant: GM GLOBAL TECHNOLOGY OPERATIONS LLC, Detroit, MI (US)

(72) Inventors: Nagappan Ramaswamy, Troy, MI (US); Roland J. Koestner, Penfield, NY (US); Swaminatha P. Kumaraguru, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 16/552,477

(22) Filed: Aug. 27, 2019

(65) Prior Publication Data

US 2021/0066726 A1 Mar. 4, 2021

(51) Int. Cl.
| | |
|---|---|
| *H01M 8/10* | (2016.01) |
| *H01M 4/88* | (2006.01) |
| *C08J 3/24* | (2006.01) |
| *C08K 5/23* | (2006.01) |
| *C08K 5/31* | (2006.01) |
| *H01M 4/86* | (2006.01) |
| *C08K 5/3472* | (2006.01) |

(52) U.S. Cl.
CPC .......... *H01M 4/8857* (2013.01); *C08J 3/242* (2013.01); *C08K 5/235* (2013.01); *C08K 5/31* (2013.01); *C08K 5/3472* (2013.01); *H01M 4/8605* (2013.01); *H01M 4/881* (2013.01); *H01M 4/8807* (2013.01)

(58) Field of Classification Search
CPC ............ H01M 4/8857; H01M 4/8842; H01M 4/8825; H01M 4/8605; H01M 4/8807; H01M 4/881; C08J 3/242; C08K 5/235; C08K 5/31; C08K 5/3472
See application file for complete search history.

(56) References Cited

U.S. PATENT DOCUMENTS

2008/0248944 A1 10/2008 Thate et al.
2012/0225371 A1* 9/2012 Kim ...................... C08J 5/2293
429/484

* cited by examiner

*Primary Examiner* — Raymond Alejandro
(74) *Attorney, Agent, or Firm* — Quinn IP Law (57) ABSTRACT

Systems, methods, fuel cells, and mixtures to inhibit ionomer permeation into porous substrates using a crosslinked ionomer are described. A method includes preparing an ionomer premix, mixing a crosslinking additive with the ionomer premix to thereby form a crosslinked-ionomer solution, and adding catalyst particles to the crosslinked-ionomer solution to produce a catalyst ink. The ionomer premix includes an ionomer dispersed within a solvent. The catalyst ink includes the catalyst particles distributed homogenously therethrough. The catalyst ink may be cast onto a porous substrate and dried to thereby form a catalyst layer for use in a fuel cell.

8 Claims, 8 Drawing Sheets

FUEL-CELL CATALYST INK ADDITIVES TO INHIBIT IONOMER PERMEATION

INTRODUCTION

The disclosure relates to the field of fuel cells and, more specifically, to additives to inhibit ionomer permeation into porous substrates.

Fuel-cell systems can be used as a power source in a wide variety of applications to provide electrical energy. The generated electrical energy may be immediately used to power a device such as an electric motor. Additionally, or alternatively, the generated electrical energy may be stored for later use by employing, for example, batteries.

In some applications, fuel cells are incorporated into stationary structures to provide electric power to buildings, residences, and the like. In some applications, fuel cells are incorporated into devices such as smart phones, video cameras, computers, and the like. In some applications, fuel cells are incorporated into vehicles to provide or supplement motive power.

Catalyst inks are used in the manufacture of electrodes for fuel cells. The catalyst inks include catalyst powder and ionomers suspended in one or more solvents, such as a mixture of alcohol and water, in a specific ratio. The catalyst powder may include platinum nanoparticles dispersed on carbon black support. The catalyst ink is then applied onto porous materials such as Gas Diffusion Layers (GDL). After the catalyst ink is laid down on the GDL, the ink is dried in an oven to drive off the solvent from the electrode. However, the laydown of the wet catalyst ink leads to a loss of almost ~50% of the ionomer within the electrode ink into the porous GDL material.

SUMMARY

It is desirable to optimize the ionomer content in the electrode and to inhibit excessive ionomer permeation from the catalyst ink into porous layers. The catalyst ink includes a crosslinked ionomer.

According to aspects of the present disclosure, a method includes preparing an ionomer premix, mixing a crosslinking additive with the ionomer premix to thereby form a crosslinked-ionomer solution, and adding catalyst particles to the crosslinked-ionomer solution to produce a catalyst ink. The ionomer premix includes an ionomer dispersed within a solvent. The catalyst ink includes the catalyst particles distributed homogenously therethrough.

According to further aspects of the present disclosure, the method further includes casting the catalyst ink onto a porous substrate and drying the catalyst ink coated on the porous substrate to thereby form a catalyst layer for use in a fuel cell.

According to further aspects of the present disclosure, the porous substrate is selected from the group consisting of a gas-diffusion medium and a micro-porous layer.

According to further aspects of the present disclosure, the crosslinking additive is a heterocyclic organic base.

According to further aspects of the present disclosure, the heterocyclic organic base is a low-molecular-weight cyclic guanidine-based compound.

According to further aspects of the present disclosure, the heterocyclic organic base includes at least two nitrogen atoms.

According to further aspects of the present disclosure, the at least two nitrogen atoms share a common carbon atom.

According to further aspects of the present disclosure, the crosslinking additive is a triazabicyclo alkene.

According to further aspects of the present disclosure, the crosslinking additive is 7-methyl-1,5,7-triazabicyclodecene or 1,2,4-triazole.

According to further aspects of the present disclosure, the crosslinking additive is added in an amount of from 5% by weight to 20% by weight based on a weight of catalyst-support particles within the ionomer premix.

According to further aspects of the present disclosure, the crosslinking additive is added in an amount of from 6% by weight to 11% by weight based on a weight of catalyst-support particles within the ionomer premix.

According to further aspects of the present disclosure, the crosslinking additive is added in an amount of 10% by weight based on a weight of catalyst-support particles within the ionomer premix.

According to aspects of the present disclosure, a fuel cell includes a membrane, a gas diffusion medium, and a catalyst layer disposed between the membrane and the gas diffusion medium. The formation of the catalyst layer includes preparing an ionomer premix, mixing a crosslinking additive with the ionomer premix to thereby form a crosslinked-ionomer solution, and adding catalyst particles to the crosslinked-ionomer solution to produce a catalyst ink, casting the catalyst ink onto the gas diffusion medium to fabricate the electrode, and drying the electrode to thereby form the catalyst layer or the electrode. The ionomer premix includes an ionomer dispersed within a solvent. The catalyst ink includes the catalyst particles distributed homogenously therethrough.

According to further aspects of the present disclosure, the crosslinking additive is a heterocyclic organic base.

According to further aspects of the present disclosure, the heterocyclic organic base is a low-molecular-weight cyclic guanidine-based compound.

According to further aspects of the present disclosure, the heterocyclic organic base includes at least two nitrogen atoms.

According to further aspects of the present disclosure, the at least two nitrogen atoms share a common carbon atom.

According to further aspects of the present disclosure, the crosslinking additive is a triazabicyclo alkene.

According to further aspects of the present disclosure, the crosslinking additive is 7-methyl-1,5,7-triazabicyclodecene or 1,2,4-triazole.

According to further aspects of the present disclosure, the crosslinking additive is added in an amount of 10% by weight based on a weight of catalyst-support particles within the ionomer premix.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description.

Systems and methods in accordance with the present disclosure crosslink ionomer within the catalyst ink prior to application of the electrode ink onto a substrate to fabricate the electrode. Beneficially, the crosslinked ionomer chains are provided in a size that inhibits penetration of the crosslinked ionomer into the substrate while optimizing permeability and catalyst utilization of the catalyst layer 42 resulting from application of the catalyst ink. Systems and methods in accordance with the present disclosure yield optimized electrode designs by reducing the ionomer used to produce the catalyst layer 42, reducing batch-to-batch variability of the catalyst-to-ionomer ratio in electrodes, optimizing catalyst utilization during operation of the fuel cell, optimizing permeability of the adjacent porous layers to reactants and products of the fuel cell reaction, reducing resistance of the catalyst layer 42 to proton transport, and/or increasing cell voltages of the resultant fuel cells.

Figure 1:
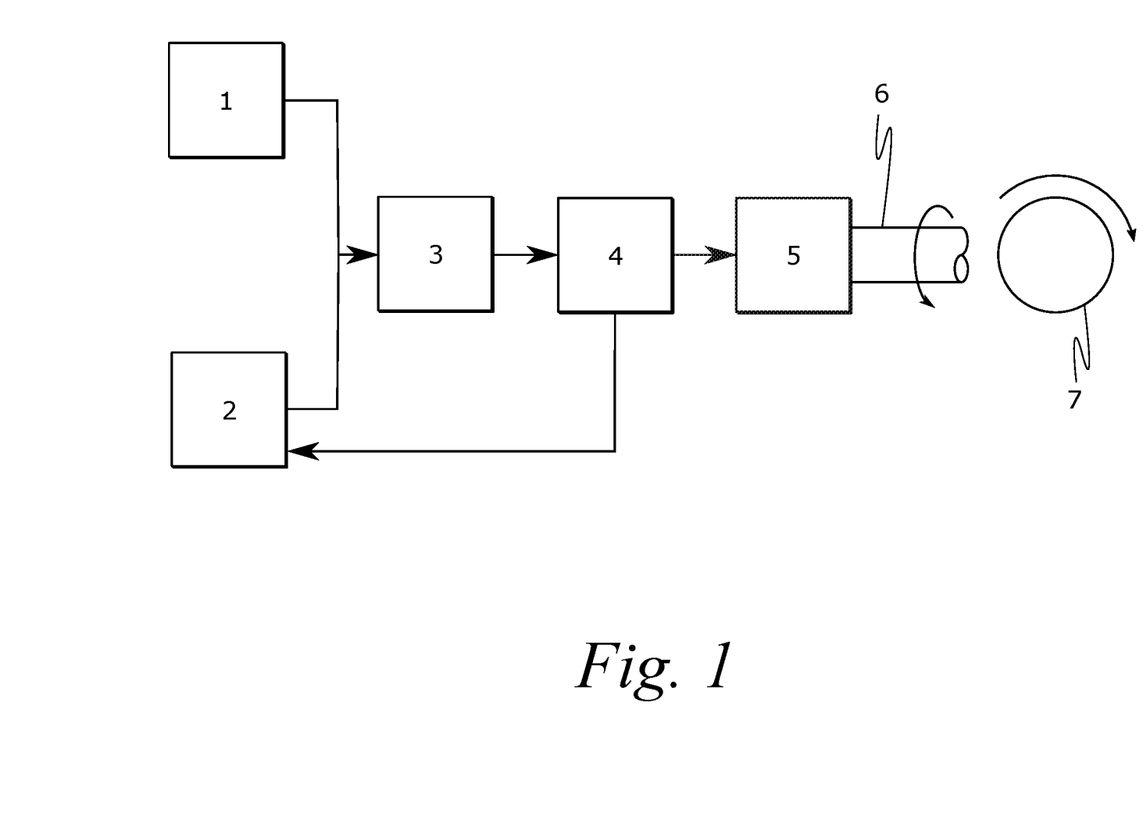
FIG. 1 is a schematic diagram of a fuel-cell system including a fuel-cell stack, according to aspects of the present disclosure.

FIG. 1 is a schematic diagram of a fuel-cell system configured to produce motive power. The fuel-cell system includes an oxidant source 1, a fuel source 2, a reactant processing system 3, a fuel-cell stack 4, at least one energy storage device 5, and a motor 6.

The oxidant source 1 and the fuel source 2 provide reactants to the fuel-cell system for generating electrical energy through chemical reactions. As used herein, "reactants" can refer to fuels, oxidants, or both as the context dictates. The reactants include a suitable fuel and oxidant combination. For example, the fuel may be hydrogen and the oxidant may be oxygen. Other fuels can be used such as natural gas, methanol, gasoline, and coal-derived synthetic fuels, for example. The oxygen may be provided, for example, by drawing air from the atmosphere and compressing, via a compressor, the air for use by the fuel-cell stack 4.

The reactant processing system 3 receives the oxidant from the oxidant source 1 and/or the fuel from the fuel source 2. In some aspects, the reactant processing system 3 converts raw fuel into a suitable form for the fuel-cell stack 4. For example, the reactant processing system 3 may react methanol to produce hydrogen gas for supplying to the fuel-cell stack 4. In some aspects, the reactant processing system 3 additionally or alternatively conditions one or more of the reactants by adjusting factors such as temperature, pressure, humidity, and the like. In some aspects, the reactant processing system 3 may be omitted.

The fuel-cell stack 4 is configured to receive the reactants from the reactant processing system 3 and produce electrical energy by promoting redox reactions. For example, hydrogen fuel can be reacted with oxygen to produce electricity with heat and water as by-products.

The energy storage device 5 is configured to receive energy produced by the fuel-cell stack 4 and provide the energy to ancillary components. The energy storage device 5 may store the power for later use or may use the power substantially instantaneously to thereby provide a buffer against power fluctuations that may damage ancillary components such as the motor 6.

The motor 6 is configured to convert the electrical energy stored in the energy storage device 5 into work. The motor 6 can be used to drive, for example, a motive device such as a wheel 7.

Figure 2:
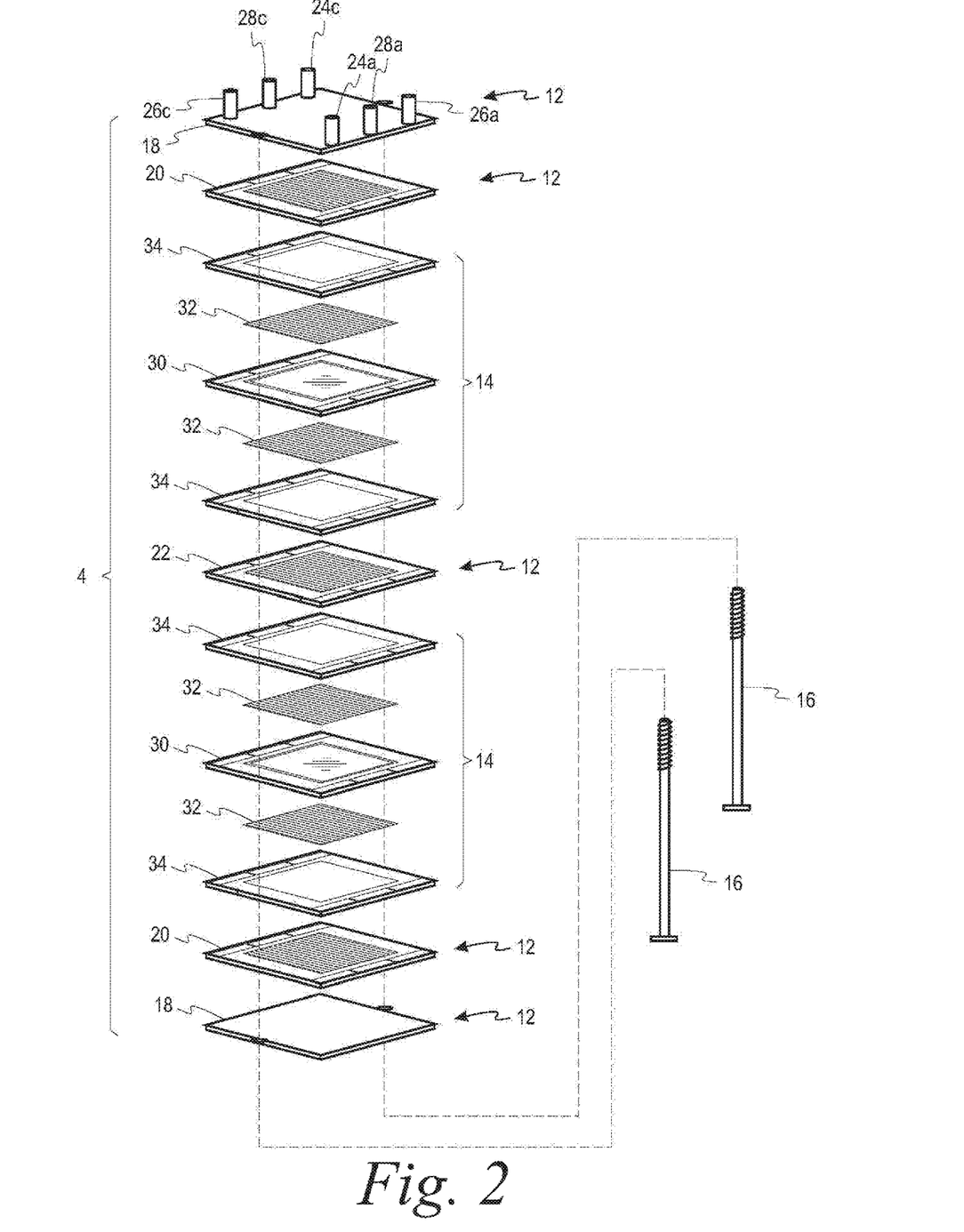
FIG. 2 is a schematic exploded view of the fuel-cell stack of FIG. 1.

FIG. 2 is an exploded view of the fuel-cell stack 4. The fuel-cell stack 4 includes a plurality of plates 12, at least one fuel cell 14, and a compressive member 16. The plurality of plates 12 may include a suitable combination of plates 12 such as endplates 18, monopolar plates 20, bipolar plates 22, combinations thereof, and the like. Each of the monopolar plates 20 is disposed adjacent a respective fuel cell 14, and each of the bipolar plates 22 is disposed between a pair of fuel cells 14.

The compressive member 16 is configured to apply a compressive force to the fuel-cell stack 4 along the stacking direction. The compressive force secures the plates 12 and fuel cells 14 in position through a contact pressure between adjacent components. In some aspects, the compressive member 16 includes a plurality of threaded rods that engage structures on the endplates 18. By tightening the threaded rods, a compressive force is increased to a desired level along the stacking direction which results in a contact pressure being distributed along seals between adjacent components. In some aspects, the compressive members 16 engage less than the entire fuel-cell stack 4. For example, compressive members 16 may engage two adjacent plates 12 to apply a compressive force to the two plates 12 or may engage a number of adjacent plates 12 to apply a compressive force to the number of adjacent plates 12.

The endplates 18 are disposed at the top and bottom of the fuel-cell stack 4. The endplates 18 include fuel inlets 24a, fuel outlets 24c, oxidant inlets 26a, oxidant outlets 26c, coolant inlets 28a, and coolant outlets 28c disposed thereon. As used herein, "fluids" can refer to fuels, oxidants, coolants, or any combination thereof as the context dictates. For example, "fluid inlets 24a, 26a, 28a" can refer to any or all of fuel inlets 24a, oxidant inlets 26a, or coolant inlets 28a as the context dictates, and "reactant channels 24b, 26b" can refer to either or both of fuel channels 24b and oxidant channels 26b as context dictates. It is contemplated that certain of the fluid inlets 24a, 26a, 28a and fluid outlets 24c, 26c, 28c can be located on one endplate 18 with the remaining fluid inlets 24a, 26a, 28a and fluid outlets 24c, 26c, 28c being located on the opposite endplate 18.

Figure 3:
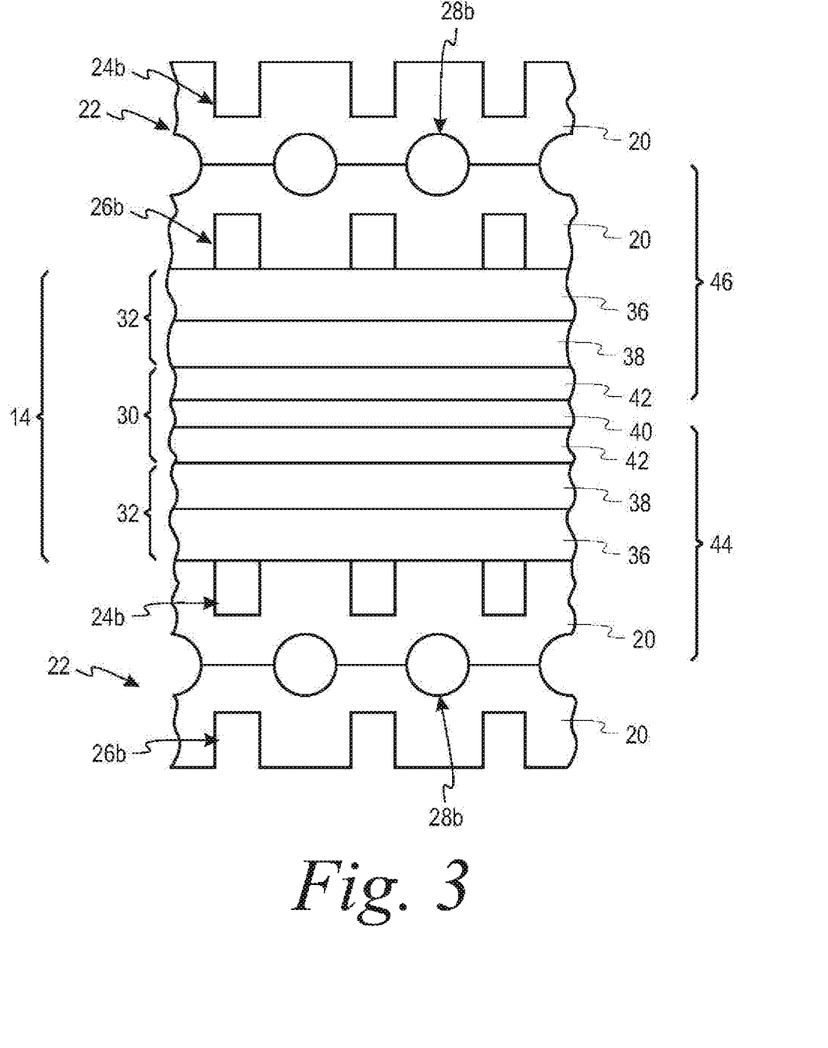
FIG. 3 is a schematic lateral cross-sectional view of a portion of the fuel-cell stack of FIG. 2.

FIG. 3 illustrates a lateral cross-sectional view of a fuel cell 14 within the fuel-cell stack 4. The fuel cell 14 includes a membrane-electrode assembly 30 and gas-diffusion media 32 with an optional gasket 34 (FIG. 2). The gas-diffusion media 32 are porous layers that facilitate delivery of reactants from the reactant channels 24b, 26b of the bipolar plates 22 to the membrane-electrode assembly 30. The gas-diffusion media 32 include a porous layer 36 and a micro-porous layer 38. In some aspects, the gas-diffusion media 32 is a unitary structure defining the porous layer 36 at a first surface and the micro-porous layer 38 at a second surface opposite the first surface. It is contemplated that the gas-diffusion media 32 may include, for example, only the porous layer 36 or only the micro-porous layer 38.

In some aspects, the gas-diffusion media 32 are configured to provide a consistent local concentration of reactants across the face of the membrane-electrode assembly 30 such that portions of the membrane-electrode assembly 30 aligned with lands of the adjacent plate 12 receive substantially the same exposure to reactants as portions of the membrane-electrode assembly 30 aligned with reactant channels 24b, 26b of the adjacent plate 12.

The gas-diffusion media 32 also provide electrical conduction, thermal conduction, and mechanical support. The gas-diffusion media 32 are formed from suitable materials, such as polymers or coated materials, to optimize desired performance parameters. In some aspects, the gas-diffusion media 32 or portions thereof are formed from carbon paper, carbon cloth, or fluoropolymers such as polytetrafluoroethylene ("PTFE"). In some aspects, the gas-diffusion media 32 include carbon paper fluoropolymers coating the strands.

The membrane-electrode assembly 30 is configured to generate an electric charge by facilitating reduction and oxidation of the reactants. The membrane-electrode assembly 30 includes a membrane 40 disposed between a pair of catalyst layers 42 defining an anode side 44 and a cathode side 46. The catalyst layer 42 on the anode side 44 is configured to facilitate ionization of the fuel. For example, hydrogen gas is separated into two protons and two electrons at the anode-side catalyst layer 42. The catalyst layer 42 on the cathode side 46 is configured to facilitate combination of the ionized fuel with the oxidant. For example, oxygen is combined with the two protons and two electrons to produce one water molecule.

The catalyst layers 42 include, for example, catalyst particles having a finely divided catalyst dispersed on catalyst-support particles, such as carbon black, and mixed with an ionomer. The catalyst is configured to catalyze the half-cell reaction of the respective reactants. The catalyst of the anode side 44 may be different from the catalyst of the cathode side 46. In some aspects, the anode-side catalyst is platinum, and the cathode-side catalyst is palladium. In some aspects, the anode-side catalyst is platinum, and the cathode-side catalyst is platinum or based on platinum alloys.

The catalyst-support particles are configured to increase the catalytic ability of a given amount of catalyst. Catalytic ability is increased, for example, by the catalyst forming a plurality of lands on exposed surfaces of the catalyst-support particles such that a predetermined number of reaction sites are provided while the amount of catalyst is reduced as compared to unsupported catalyst. In some aspects, the catalyst-support particles are carbon.

The ionomer is configured to provide ion transport to the catalyst particles. In some aspects, the ionomer is a perfluorosulfonic acid homopolymer, a perfluorosulfonic acid copolymer with hydrophobic monomers such as tetrafluoroethylene or perfluorinated dioxalane and its substituted derivatives, or a sulfonated block copolymer incorporating these same monomers. The molar mass should be above 200 kilodaltons (kD), while the equivalent weight should range from 500 g ionomer per mol sulfonate anion to 1200 g ionomer per mol sulfonate anion to provide a suitable balance between water solubility and proton transport resistance.

The membrane 40 is configured to transport ions from the catalyst layer 42 on the anode side 44 to the catalyst layer 42 on the cathode side 46 while inhibiting transfer of electrons therethrough. In some aspects, the membrane 40 is a proton-exchange membrane configured to transfer protons therethrough.

While the illustrated structure and composition of the anode side 44 and the cathode side 46 are substantially symmetrical about the membrane 40, it is contemplated that components of the anode side 44 can include properties which differ from those of the cathode side 46.

In some aspects, the gas-diffusion media 32 of the cathode side 46 are also configured to transport products such as water away from the membrane-electrode assembly 30 to inhibit flooding. For example, in some aspects, the gas-diffusion media 32 of the cathode side 46 is thicker than that of the anode side 44 to control mass flow of water to and from the membrane 40. Additionally, or alternatively, in some aspects, at least a portion of the gas-diffusion media 32 of the cathode side 46 is hydrophobic to control mass flow of water therethrough. The porous layer 36, the micro-porous layer 38, or both may be hydrophobic.

Bipolar plates 22 can be formed using a variety of methods such as additive manufacturing including 3D-printing or other standard forming techniques. For example, the rear faces of two monopolar plates 20 can be placed together and the monopolar plates 20 bonded to form the bipolar plate 22. The bond can be formed by, for example, welding or use of an adhesive. In some aspects, the bipolar plate 22 is formed by stamping reactant channels 24b, 26b onto opposite faces of a single sheet without the presence of cooling channels 28b therebetween.

During assembly of the fuel cell 14, suspensions may be coated onto porous substrates to form resulting layers of the fuel cell 14. For example, an electrode ink may be coated onto the gas-diffusion media 32—e.g., the micro-porous layer 38—to form the catalyst layer 42.

Coating solutions, such as catalyst inks, onto porous substrates allows material from the solution to migrate into the porous substrate. For example, the ionomer within the electrode ink may permeate the gas-diffusion media 32, which increases total ionomer needed to produce a desired catalyst layer 42. Such migration of material from the liquid into the porous substrate increases component cost by increasing the amount of material required to be applied onto the porous substrate to produce a resultant layer having a desired amount of material.

What is more, solutions having multiple components further complicates formation of the resultant layer. For example, a second component may not permeate the porous substrate or may permeate the porous substrate at a different rate from the first component, which may result in formation of a gradient of the materials within the catalyst layer 42 and/or the porous substrate. Such gradients may result in non-optimal performance and/or permeability of one or more of the layers. For example, excessive permeation of ionomer into the porous substrate may reduce proton transport resistance, lead to flooding at the interface between the gas-diffusion media 32 and catalyst layer 42 and mass transport issues, such as decreased oxygen permeability from reduced porosity of the gas-diffusion media 32.

Further, the proportion of materials within the resulting layer is also affected because differing migration rates may produce a less-than-optimal ratio of material in the resulting layer. For example, the ionomer of the electrode ink may leach into the gas diffusion media 32 while the loaded catalyst-support particles remain substantially within the catalyst layer 42 during formation, which results in a catalyst-to-ionomer ratio within the catalyst layer 42 that is higher than the catalyst-to-ionomer ratio of the electrode ink used to produce the catalyst layer 42. Such permeation may contribute to higher proton transport resistance in the electrode layer due to ionomer starvation as well as higher gas transport resistance in the GDL due to the presence of hydrophilic ionomer. Surprisingly, use of crosslinked ionomers as described herein inhibit permeation of the ionomer into the porous layer 36 during formation of the catalyst layers 42 while optimizing operating conditions such as oxygen or proton transport resistance of the resultant catalyst layer 42.

Figure 4:
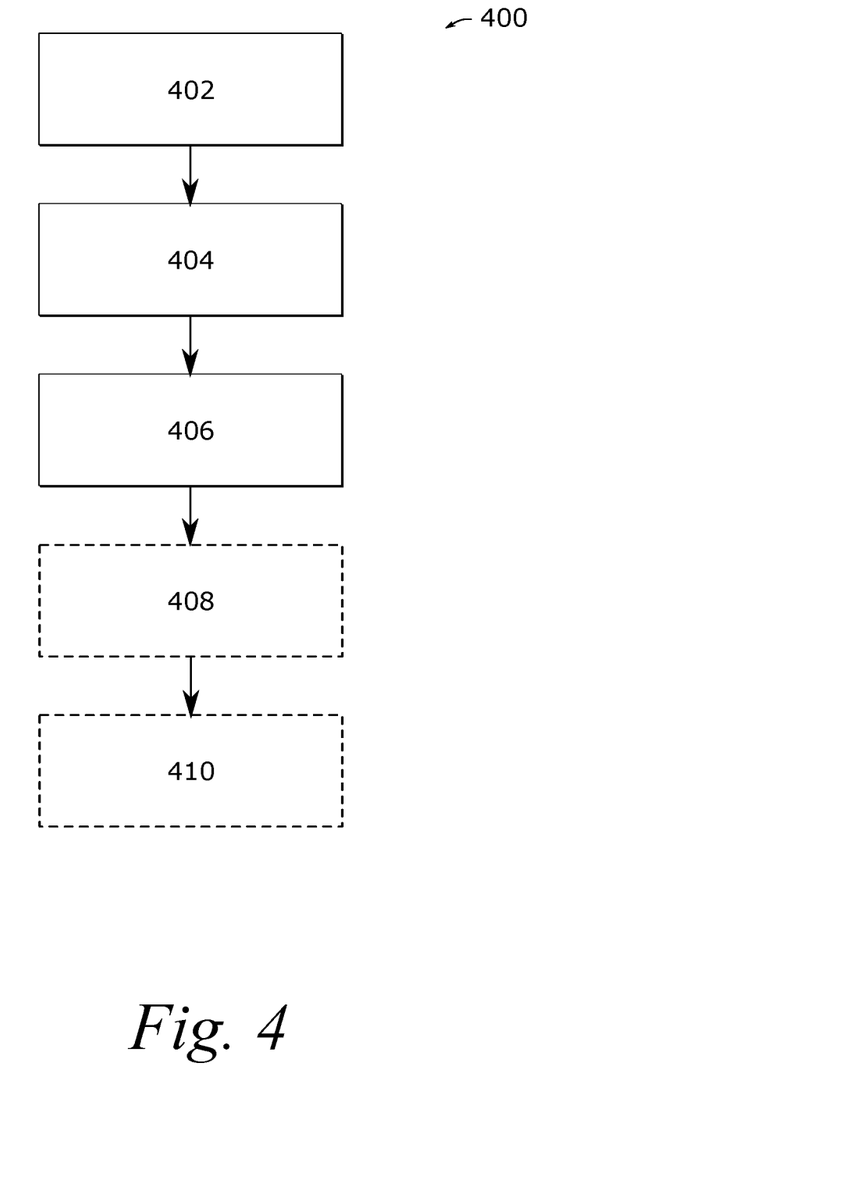
FIG. 4 is a method for producing a catalyst ink, according to aspects of the present disclosure.

FIG. 4 illustrates an example method 400 of preparing an electrode ink. The method 400 includes preparing 402 an ionomer premix including an ionomer dispersed within a solvent, mixing 404 a crosslinking additive with the ionomer premix to thereby form a crosslinked-ionomer solution, and adding 406 catalyst particles to the crosslinked-ionomer solution to produce the electrode ink.

The ionomer premix is a mixture of the ionomer and the solvent. The ionomer premix may be a solution, a suspension, a colloid, or combination thereof. The ionomer is a suitable polymer configured to provide for proton and water transport. The ionomer also acts as a structural support for the catalyst layer 42 and a binder for catalyst particles therein.

The solvent is configured to maintain the ionomer in a condition for reaction with the crosslinking additive. In some aspects, the solvent is configured to facilitate reaction with the crosslinking additive by facilitating formation and/or longevity of reaction intermediates. The solvent may be suitable aqueous and/or organic solvents.

In some aspects, the solvent is or includes an aqueous or non-aqueous primary alcohol. For example, the primary alcohol may be ethanol, isopropyl alcohol, n-propyl alcohol, combinations thereof, and the like. Beneficially, the aqueous or non-aqueous primary alcohols reduce surface cracking of the catalyst layer 42, such as the surfaces abutting adjacent layers of the fuel cell.

In some aspects, the solvent is or includes an aqueous or non-aqueous higher-order alcohol, such as secondary or tertiary alcohols. Examples of suitable aqueous or non-aqueous higher-order alcohols include ethylene glycol, propylene glycols, dipropylene glycol and butylene glycols, glycerin, hexylene glycol, combinations thereof, and the like.

The crosslinking additive is configured to chemically crosslink the ionomer within the ionomer premix. In some aspects, the crosslinking additive is a heterocyclic organic base. The heterocyclic organic base may be low-molecular-weight cyclic guanidine-based compounds. As used herein, the term "low molecular weight" is used to mean less than about 900 daltons.

In some aspects, the heterocyclic organic base includes at least two nitrogen atoms. In some preferred aspects, the at least two nitrogen atoms of the crosslinking additive share a common carbon atom. While not being bound by theory, it is believed that concentration of the nitrogen atoms about a common carbon atom optimizes electron density distributions and/or conformal shape of the compound to promote beneficial reaction properties during ionomer crosslinking.

In some aspects, the heterocyclic organic base is a triazabicycloalkene, such as 1,5,7-triazabicyclodecene, 7-methyl-1,5,7-triazabicyclodecene, 7-ethyl-1,5,7-triazabicyclodecene, 7-isopropyl-1,5,7-triazabicyclodecene, and the like. Preferably, the crosslinking additive is 7-methyl-1,5,7-triazabicyclodecene with measured pKa's at 14.5 vs. 1.5. for the protonated N-sites. While not being bound by theory, the more basic N-site quickly or immediately adducts to the sulfonate anion on the ionomer chain, while the less basic N-site is largely activated at higher ionomer concentration during solvent drying of the electrode ink that then drives extensive polymer chain cross-linking.

In a similar fashion, the 1H-1,2,4-triazole additive has measured pKa's at 10.0 vs. 2.4. The less basic N-site is activated at slightly lower ionomer concentration in this case which provides a larger range in possible catalyst ink formulations. In both cases however, the weak binding for the N-site with lower pKa also provides an alternate proton transport mechanism under dry operating conditions.

In some aspects, the crosslinking additive is present in the ionomer premix in an amount of less than 20% by weight based on a weight of the catalyst-support particles in the catalyst ink. Beneficially, such an amount avoids excessive gelation of the catalyst ink, for example, during application to the porous substrate to thereby optimize formation and uniformity of the catalyst layer 42.

Particularly, the crosslinking additive is present in the ionomer premix in an amount of from 5% by weight to 20% by weight based on a weight of the catalyst-support particles. Beneficially, such an amount inhibits permeation of ionomer into the porous substrate of from 15% to 20% as compared to a non-crosslinked ionomer to thereby optimize ionomer used during formation of the catalyst layer 42. More particularly, the crosslinking additive is present in the ionomer premix in an amount of from 4% by weight to 12% by weight based on a weight of catalyst-support particles. Beneficially, such an amount optimizes catalyst utilization of the catalyst layer 42 during operation of the fuel cell 14. Yet more particularly, the crosslinking additive is present in the ionomer premix in an amount of from 6% by weight to 11% by weight based on a weight of catalyst-support particles. Beneficially, such an amount inhibits flooding at the boundary between the catalyst layer 42 an abutting porous layer 36, such as the microporous layer 38, and optimizes mass transport of oxygen from the catalyst layer 42. In some aspects, the crosslinking additive is present in the ionomer premix in an amount of 10% by weight based on a weight of catalyst-support particles. Beneficially, such an amount optimizes proton transport resistance of the catalyst layer 42.

The crosslinking additive is mixed with the ionomer premix using, for example, mechanical agitation for a predetermined period of time. In some aspects, the solution is agitated for from 5 minutes to 1 hour. Beneficially, such agitation provides a homogeneous distribution of the amine adduct in the ionomer solution that effectively inhibits permeation of the ionomer into the porous substrate.

The catalyst particles are added to the ionomer solution and milled until a plateau in particle size distribution vs. process time is measured by light scattering. In one example, the catalyst-support particles support for the dispersed catalyst particles are subjected to milling for 24 hours.

In some aspects, the solution is agitated for from 15 minutes to 45 minutes. Beneficially, such agitation distributes the additive adduct distribution in the ionomer solution. The measured viscosity of the electrode ink does not change substantially at this point since the N-site with lower pKa is not yet fully activated.

Optionally, the method 400 may further include casting 408 the catalyst ink onto a porous substrate and drying 410 the electrode ink to thereby form the catalyst layer 42. In some aspects, the porous substrate is the gas-diffusion media 32, the porous layer 36, or the micro-porous layer 38. The catalyst ink may be applied to the porous substrate using suitable methods such as spraying, brushing, painting, and/or screen printing. In some aspects, the catalyst ink includes a casting solvent that is different from the solvent of the ionomer premix. The casting solvent may be, for example, aqueous or organic. In some aspects, the casting solvent is an alcohol or carboxylic acid. For example, the casting solvent may be dimethylacetic acid (DMAc) or trifluoroacetic acid (TFA). In some aspects, the catalyst ink excludes the solvent of the ionomer premix. The solvent may be extracted from the ionomer premix or catalyst ink using suitable methods, such as extraction or drying and resuspension. For example, the crosslinked ionomer may be extracted from the ionomer-premix solvent by exposing the ionomer premix to a casting solvent with a higher affinity for the crosslinked ionomer than the affinity of the ionomer-premix solvent.

The ionomer-premix solvent and/or the casting solvent may be mixtures of different liquids. In some aspects, the catalyst ink includes the loaded catalyst-support particles and the crosslinked ionomer dispersed in a mixture of an organic solvent, such as alcohol, and inorganic solvent, such as water. In a mixture of water and alcohol, as water concentration increases, proton-transport resistance of the resultant layer increases while local oxygen-transport resistance of the resultant layer decreases. As used herein, the local oxygen-transport resistance is measured in s cm/$cm_{Pt}^2$ $cm_{geo}^2$, hereinafter referred to as "units," where $cm_{Pt}^2$ is surface area of platinum nanoparticle catalysts and $cm_{geo}^2$ is the geometric surface of the catalyst layer 42.

The present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover all modifications, equivalents, combinations, sub-combinations, permutations, groupings, and alternatives falling within the scope and spirit of the disclosure and as defined by the appended claims.

As used herein, unless the context clearly dictates otherwise: the words "and" and "or" shall be both conjunctive and disjunctive, unless the context clearly dictates otherwise; the word "all" means "any and all" the word "any" means "any and all"; the word "including" means "including without limitation"; and the singular forms "a", "an", and "the" includes the plural referents and vice versa.

All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

Words of approximation, such as "approximately," "about," "substantially," and the like, may be used herein in the sense of "at, near, or nearly at," "within 0%-10% of," or "within acceptable manufacturing tolerances," or a logical combination thereof, for example.

While the metes and bounds of the term "about" are readily understood, the term "about" indicates that the stated numerical value or property allows imprecision. If the imprecision provided by "about" is not otherwise understood in the art with this ordinary meaning, then "about" indicates at least variations that may arise from ordinary methods of measuring and using such parameters. For example, if not otherwise understood in the art, the term "about" means within 10% (e.g., ±10%) of the stated value.

While the metes and bounds of the term "substantially" are readily understood, the term "substantially" indicates that the stated numerical value or property allows some imprecision. If the imprecision provided by "substantially" is not otherwise understood in the art with this ordinary meaning, then "substantially" indicates at least variations that may arise from manufacturing processes and measurement of such parameters. For example, if not otherwise understood in the art, the term "substantially" means within 5% (e.g., ±5%) of the stated value.

While the metes and bounds of the term "essentially" are readily understood, the term "essentially" indicates that the stated numerical value or property allows some slight imprecision. If the imprecision provided by "essentially" is not otherwise understood in the art with this ordinary meaning, then "essentially" indicates at least negligible variations in desired parameters that may be impracticable to overcome. For example, if not otherwise understood in the art, the term "essentially" means within 1% (e.g., ±1%) of the stated value.

While the metes and bounds of the term "pure" are readily understood, the term "pure" indicates that the compound may include very slight traces of other materials. If the imprecision provided by "pure" is not otherwise understood in the art with this ordinary meaning, then "pure" indicates at least variations that may arise from separation processes and measurement of such parameters. For example, if not otherwise understood in the art, the term "pure" means above 99.9% of the stated material.

It is to be understood that the ranges provided herein include the stated range, subranges within the stated range, and each value within the stated range. For example, a range of from 5% to 20% should be interpreted to include not only the explicitly recited limits of about 5% to about 20%, but also to include individual values, such as 5%, 7%, 9%, 13%, etc., and sub-ranges, such as from about 5% to about 9%, about 7% to about 10%, etc.

While the best modes for carrying out the disclosure have been described in detail, those familiar with the art to which this disclosure relates will recognize various alternative designs and embodiments for practicing the disclosure within the scope of the appended claims.

EXAMPLES

Comparative Example 1

Figure 5:
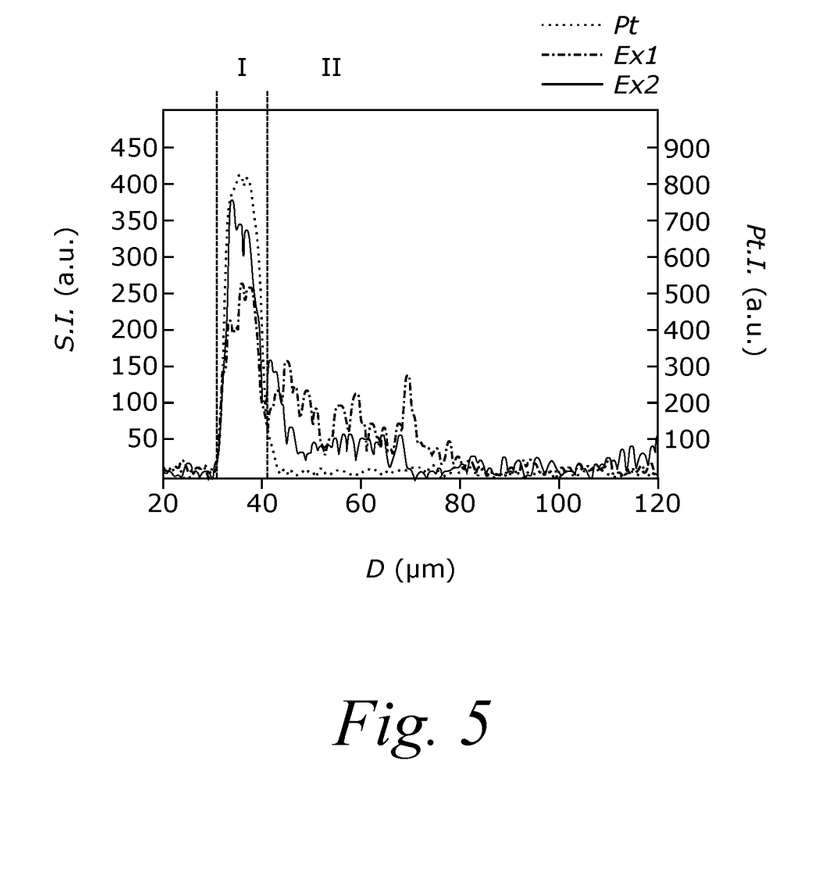
FIG. 5 illustrates a cross-sectional profile of the measured sulfur intensity for the local ionomer loading vs. distance of example assemblies by Electron Probe MicroAnalysis (EPMA)
Figure 6:
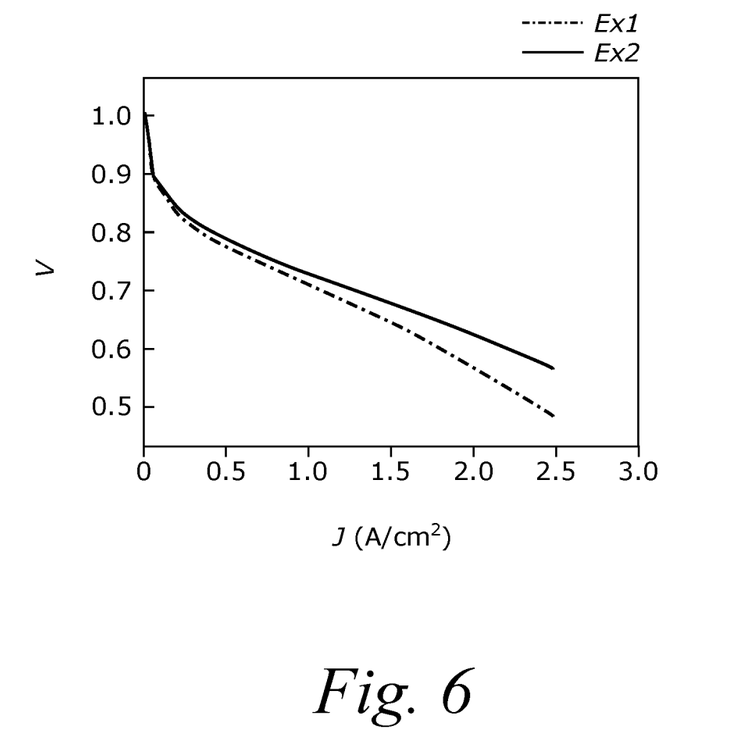
FIG. 6 illustrates a diagram of voltage vs. current density for samples of the example assemblies.

A catalyst layer with a non-crosslinked ionomer on a porous layer is prepared. The catalyst layer is formed from a non-crosslinked-ionomer solution. The non-crosslinked-ionomer solution is prepared by mixing an ionomer (Nafion®, D2020) with a solvent (n-propanol and water) to form an ionomer premix solution. The ionomer and solvent are mixed for 30 minutes to substantially suspend the ionomer within the solvent. Catalyst particles having platinum on carbon black are added to the ionomer premix and ball milled for 24 hours to form an electrode ink. The catalyst ink is applied to a porous substrate in particular to a micro-porous layer, and dried to form a catalyst layer. A cross-sectional profile measuring sulfur intensity over distance of an assembly having the non-crosslinked ionomer Ex1 is taken to an assembly having a crosslinked ionomer Ex2 using a platinum reference Pt, as is illustrated in FIG. 5. Two samples are prepared of an assembly having a non-crosslinked ionomer Ex1, and current density vs. voltage is measured under the operating conditions of $H_2$ and Air. The results are compared with three samples of an assembly having a crosslinked ionomer Ex2, as is illustrated in FIG. 6.

Example 2

A catalyst layer with a crosslinked ionomer on a porous layer is prepared. The catalyst layer is formed from a crosslinked-ionomer solution. The crosslinked-ionomer solution is prepared by mixing the same ionomer and solvent (Nafion® in n-propanol-water) to form an ionomer premix. A crosslinking additive, in particular 7-methyl-1,5,7-triazabicyclodecene, is then introduced to the ionomer premix in an amount of 10% by weight based on a weight of catalyst-support particles within the ionomer premix. The ionomer, solvent, and crosslinking additive are mixed for 30 minutes to substantially suspend the ionomer within the solvent and crosslink the ionomer. Catalyst particles of platinum-coated carbon are added to the crosslinked-ionomer solution and milled for 24 hours to form an electrode ink. The catalyst ink is applied to a porous substrate, in particular to a micro-porous layer, and dried to form a catalyst layer. A cross-sectional profile measuring sulfur intensity over distance of the assembly having the crosslinked ionomer Ex2 is taken and compared to the assembly having a non-crosslinked ionomer Ex1 using a platinum reference Pt, as illustrated in FIG. 5. As can be seen, the assembly with the crosslinked ionomer increases ionomer retention in the catalyst layer by from 15% to 20%.

Three samples are prepared of the assembly having the crosslinked ionomer Ex2, and current density vs. voltage is measured under the operating conditions of $H_2$ and Air. The results are compared with two samples of an assembly having the non-crosslinked ionomer Ex1, as illustrated in FIG. 6. As can be seen, the voltage for the assembly having crosslinked catalyst layer (0.577 V) is about 20% higher at 2.5 A/cm$^2$ than that of the assembly with a non-crosslinked catalyst layer (0.482 V).

Figure 7:
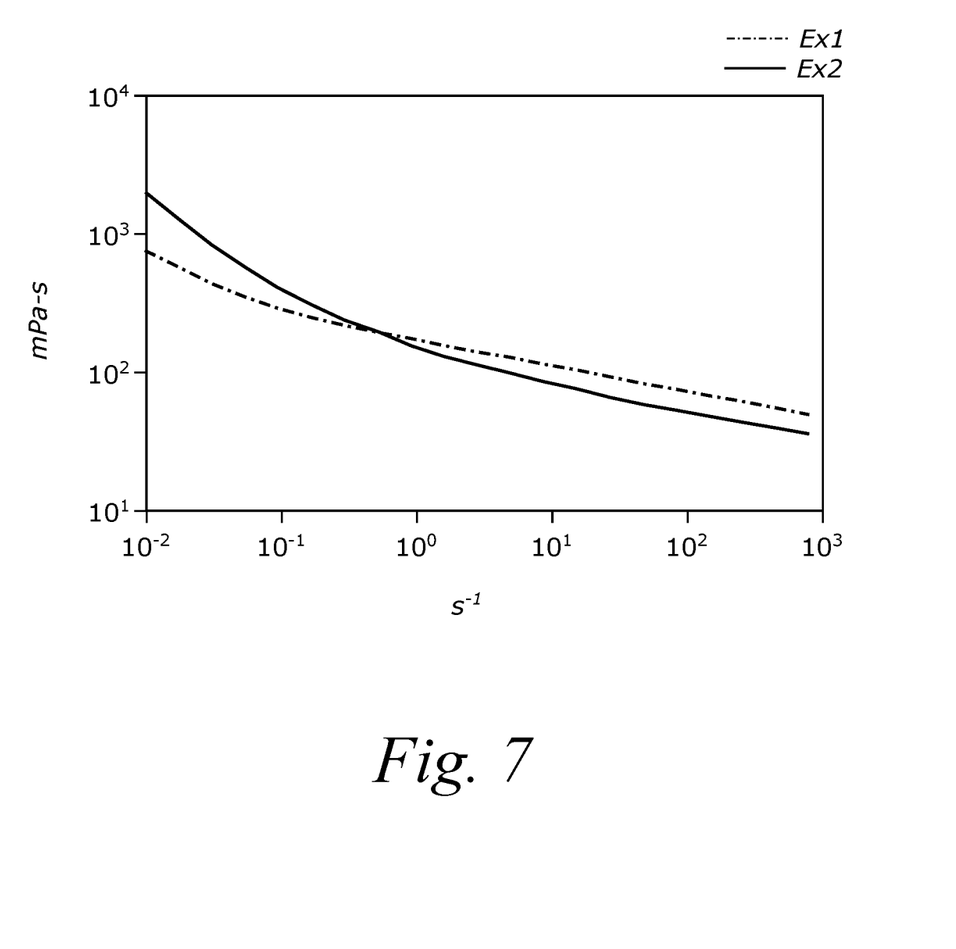
FIG. 7 illustrates the viscosity vs. applied shear rate for the example electrode inks.
Figure 8:
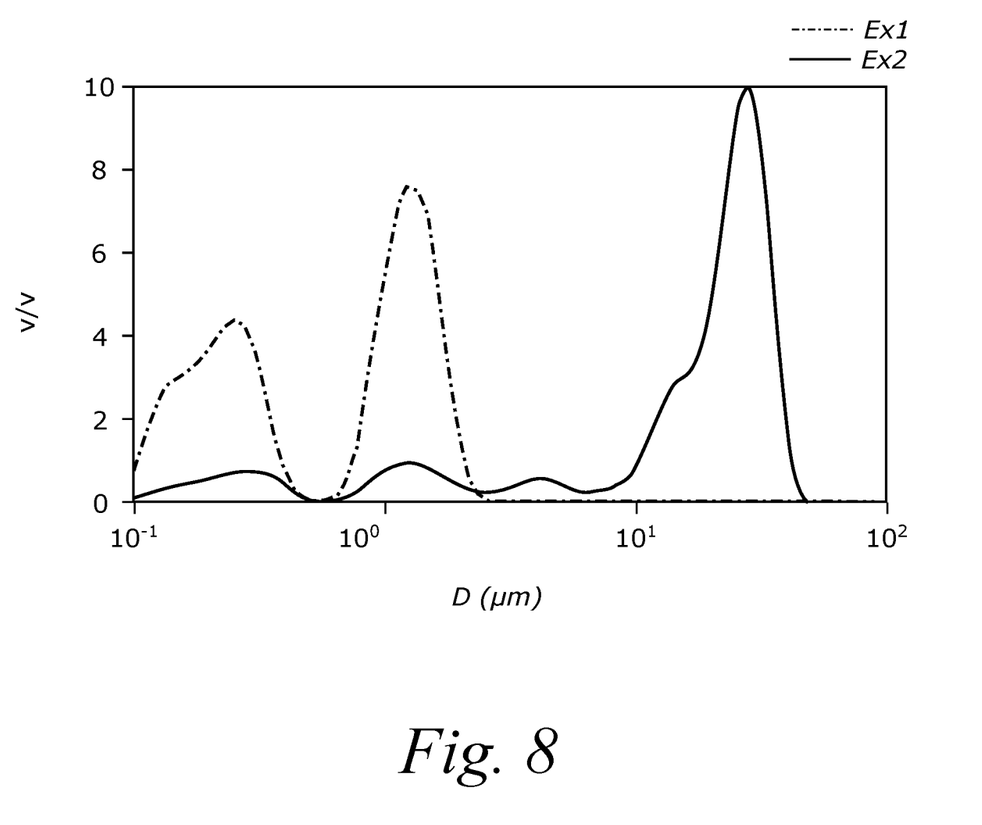
FIG. 8 shows the particle size distribution for the example electrode inks by light scattering.

The electrode ink rheology in FIG. 7 does not change substantially with cross-linking additive since the lower pKa N-site is not yet fully activated. This rheology is plotted in the down-ramp leg so that the ink is first conditioned at high shear rate. However, the beginning stage of ionomer chain cross-linking can be observed in the ink particle size distribution with cross-linked ionomer Ex2 in FIG. 8. The electrode ink is diluted with ethanol-water solvent to 0.1% carbon solids prior to measurement whereby the carbon black embedded in the cross-linked ionomer Ex2 shows a higher apparent particle size.

What is claimed is:
1. A fuel cell comprising:
a membrane;
a gas diffusion medium; and
a catalyst layer disposed between the membrane and the gas diffusion medium, wherein the catalyst layer includes:
a catalyst ink having catalyst particles distributed homogenously through a crosslinked-ionomer solution;
wherein the catalyst particles include a catalyst dispersed on catalyst-support particles;
wherein the cross-linked ionomer solution includes:
an ionomer dispersed within a solvent and having a molar mass of greater than 200 kilodaltons; and
a crosslinking additive configured to chemically cross-link the ionomer;
wherein the crosslinking additive is a heterocyclic organic base that is a low-molecular-weight cyclic guanidine-based compound having a molecular weight of less than 900 daltons.
2. The fuel cell of claim 1, wherein the crosslinking additive is a triazabicycloalkene.
3. The fuel cell of claim 1, wherein the catalyst particles are platinum-coated carbon.
4. The fuel cell of claim 2, wherein the heterocyclic organic base includes at least two nitrogen atoms.
5. The fuel cell of claim 4, wherein the at least two nitrogen atoms share a common carbon atom.
6. The fuel cell of claim 1, wherein the crosslinking additive is 7-methyl-1, 5,7-triazabicyclodecene or 1,2,4-triazole.
7. The fuel cell of claim 1, the crosslinking additive is added in an amount of from 9% by weight to 10% by weight based on a weight of the catalyst-support particles.
8. The fuel cell of claim 1, wherein the crosslinking additive is added in an amount of from 5% by weight to 20% by weight based on a weight of catalyst-support particles.

* * * * *